MEANS FOR THE GENERATION AND TRANSMISSION OF VERY LARGE PULSES OF RADIO FREQUENCY WAVES

Filed June 1, 1959

INVENTOR
KURT LANDECKER
By [signature] Atty

Nov. 28, 1961 K. LANDECKER 3,011,051

MEANS FOR THE GENERATION AND TRANSMISSION OF VERY LARGE PULSES OF RADIO FREQUENCY WAVES

Filed June 1, 1959 2 Sheets-Sheet 2

INVENTOR
KURT LANDECKER
BY
Atty.

3,011,051

MEANS FOR THE GENERATION AND TRANSMISSION OF VERY LARGE PULSES OF RADIO FREQUENCY WAVES

Kurt Landecker, Armidale, New South Wales, Australia, assignor to The University of New England, Armidale, New South Wales, Australia, a body corporate Filed June 1, 1959, Ser. No. 817,414
Claims priority, application Australia Oct. 16, 1958
9 Claims. (Cl. 250—17)

The generation of large pulses of high frequency waves is at present limited to peak powers of the order of one megawatt. The reason being that transmitters for powers exceeding this range would become prohibitively costly. There is however a demand for much higher powers for the purposes of communication, radio direction finding (radar) and ionospheric and cosmic research. The constructional elements which account for the cost of large transmitters are:

(*a*) The transmitting valves and their associated circuits (*b*) The aerial system (*c*) The coupling elements between the transmitter and the aerial system.

This invention provides means, for incorporating in a transmitting system, which will generate pulses of radio frequency waves of peak powers of up to the order of 10,000 (ten thousand) megawatts at a fraction of the cost of a conventional transmitter constructed to generate such large pulses and which will eliminate the conventional aerial system and the coupling elements therefor.

The means of this invention is a tank circuit incorporating a number of sets of electrical capacitor units, each set consisting of a condenser connected to two inductances and the free terminals of the inductances of one set are connected to spark gap terminals juxtaposed the spark gap terminals of adjoining sets of such electrical capacitor units. Charging resistors for the condensers are connected to the tank circuit and to a source of electrical potential. The tank circuit is extended spatially to such a degree that it forms at the same time a magnetic dipole or loop aerial which radiates the radio frequency waves.

The invention is described in further detail with reference to the annexed drawings wherein.

Figure 1:
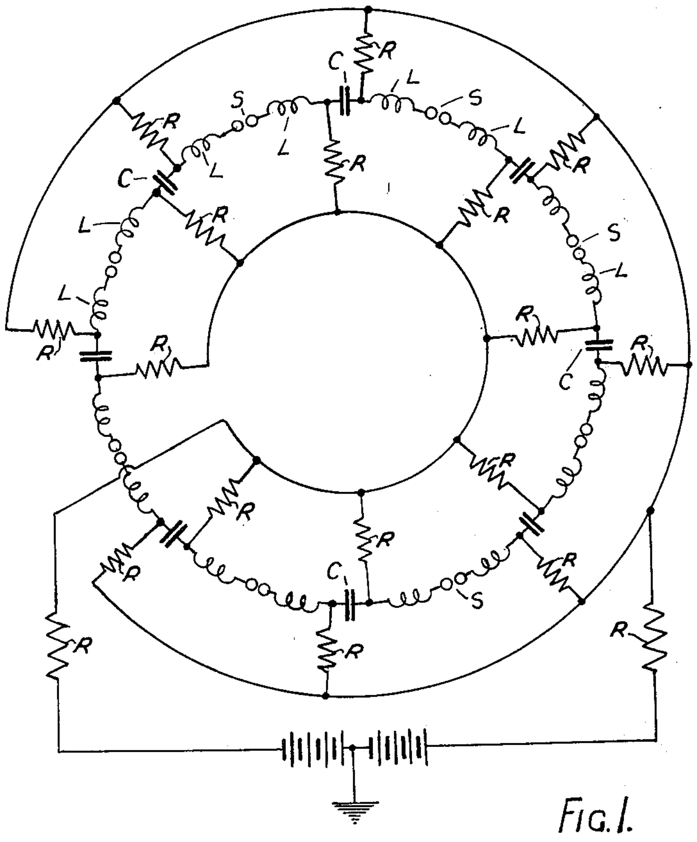
FIG. 1 is a schematic diagram of one embodiment of a tank circuit incorporating the electrical components.

Referring to FIG. 1:

A number of sets of electrical capacitor units are shown arranged in circular form in an array. In practice it is not necessary that the array is perfectly circular. A polygonal shape is nearly as efficient as a perfectly circular one. The eight sets of units shown in the diagram are representative of an arbitrarily large number of sets the exact number to be used in an actual transmitter being determined by conditions to be stated later. Each electrical capacitor unit consists of a condenser C connected to two inductances L, the free terminals of which are in turn connected to spark gap terminals S. The condensers C are charged through charging resistors R from a source of electrical potential.

When a determined potential is reached the spark gaps break down practically simultaneously. Even if the sparking distances of the gaps S are not exactly the same due, for example, to unavoidable manufacturing tolerances the breakdown will still occur practically simultaneously. This is because as soon as one gap begins to break down the potential across all the other gaps is increased. The discharge current flowing around the circular array due to the breakdown of the spark gaps oscillates at a frequency determined by the series combination of all condensers C and inductances L in the circuit. When the condensers are discharged the cycle is repeated provided the supply potential is higher than the breakdown potential of the spark gaps. The repetition frequency may be controlled by adjustment of the supply voltage and the values of the charging resistors. Alternatively it is possible to initiate and control the initiation of the emission of individual wave trains for example, by a method which will be referred to later.

The means for generating and for the transmission of electro magnetic waves according to this invention has the following advantages:

(1) The power stored in the tuning condensers is transformed into radiation in a most direct manner. Since the whole arrangement consists of a single radio frequency circuit only, no undesirable interactions of aerial and tank circuit can occur as, e.g. in conventional spark transmitters where special means are necessary to suppress an unwanted exchange of oscillatory energy between these circuits. Further, no coupling devices between transmitter and aerial as, for example, coupling coils, coupling condensers, transmission lines and the like are necessary.

Figure 2:
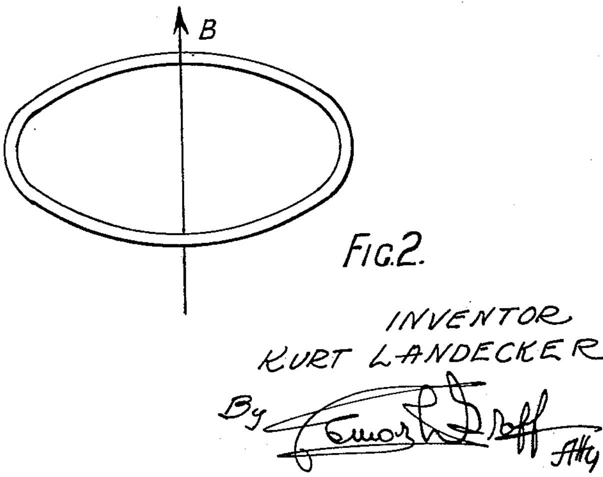
FIG. 2 is a diagram relating to an electromagnetic theorem which is applicable to means of this invention.

(2) Nowhere in the entire circuit is there a potential difference exceeding the charging potential of any one of the capacitor units forming the circuits. This statement is explained with reference to FIG. 2. If the time rate of change $\dot{B}$ (standard notation $$\dot{B}=\frac{\delta B}{\delta t}\Big)$$

of a magnetic vector field B symmetrical with respect to the centre of the annular conductor shown causes an electromotive force no matter how large along the annulus, the potentials between any two points of the annulus are zero. Applied to the circular array of electrical capacitors in the tank circuit according to this invention this means that no flash-over or corona discharge can occur on the array during operation provided the condensers C are designed to withstand the breakdown potential of the spark gaps S. This property is in contrast to conventional electric dipole aerials where corona discharges from the aerial are one of the main difficulties preventing the increase of the radiated power.

(3) For high frequency waves the inductances L need not be physically realised. These inductances can be formed solely by the internal inductances of the condensers C.

(4) Calculations and experiments show that very large pulse powers may be generated. For example, an array consisting of 50 electrical capacitors of individual capacities of $7.5\times10^{-3}$ microfarads forming a circular structure of 80 metres diameter will radiate wave trains, 16 cycles long, at a frequency of one megacycle having a peak power of 10,000 (ten thousand) megawatts. The charging voltage necessary for this condition of operation is slightly larger than 200 kilovolts which is well within the limits of commercial components being manufactured at present. The average power over one wave train is then about 500 megawatts and the Q-factor of the circuit is about 10 so that almost the entire energy is radiated at the fundamental frequency of the wave.

(5) The radiation pattern (polar diagram) and the radiation resistance of the array of electrical capacitors may be controlled by arranging any number of symmetrical reflectors or directors or a parabolic reflector in the vicinity of the circuit. The symmetrical reflector may take the shape of closed circular conductors coaxial or coplanar with the main circuit. The potentials between any two points of these circularly symmetrical reflectors or directors are also zero for the same reason outlined under (2) above.

Figure 3:
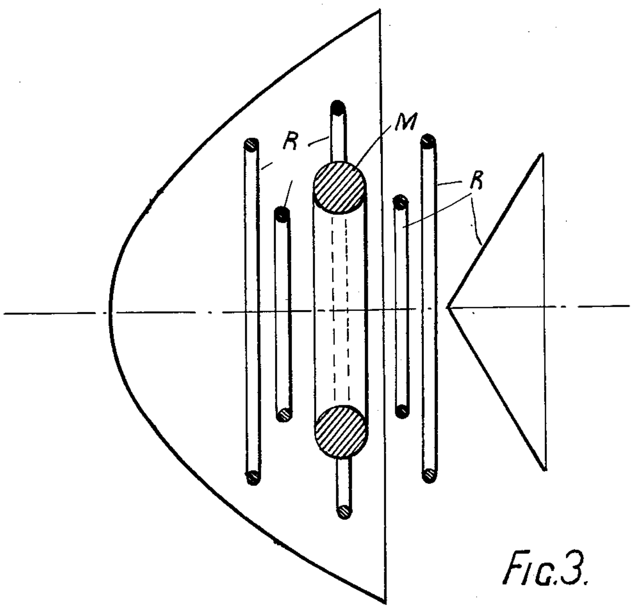
FIG. 3 is a schematic diagram showing the arrangement of reflectors and directors according to one embodiment of the invention.

Suitable arrangements of such circularly symmetrical reflectors and directors, used either singly or in combination with each other are illustrated schematically in FIGURE 3. Here M is the main circuit and R are the reflectors respectively.

For certain purposes, as for example for ionospheric soundings, it may be advantageous to suspend the array of electrical capacitors above ground by a suitable fraction of one wavelength in order to radiate a larger part of the wave energy in an upwards direction. For other purposes it may be advantageous to erect the array of electrical capacitors at or near the bottom of a natural valley in order to obtain a concentrated beam of radiation.

If the diameter of the array of electrical capacitors is made large compared to the wave length for the purpose of increasing the radiation resistance, it may be necessary to provide means to ensure that all spark gaps discharge simultaneously. This is because the discharge impulse needs a certain time to travel around the circumference of the array. According to this invention this may be accomplished by superimposing a voltage impulse upon the charging potential. The charging circuit then takes the form of symmetrical wires connecting the charging resistances with a common point on the axis of the array. The voltage impulse travelling very nearly with the velocity of light then arrives at the same instant of time at the condenser and spark gap terminals.

Figure 4:
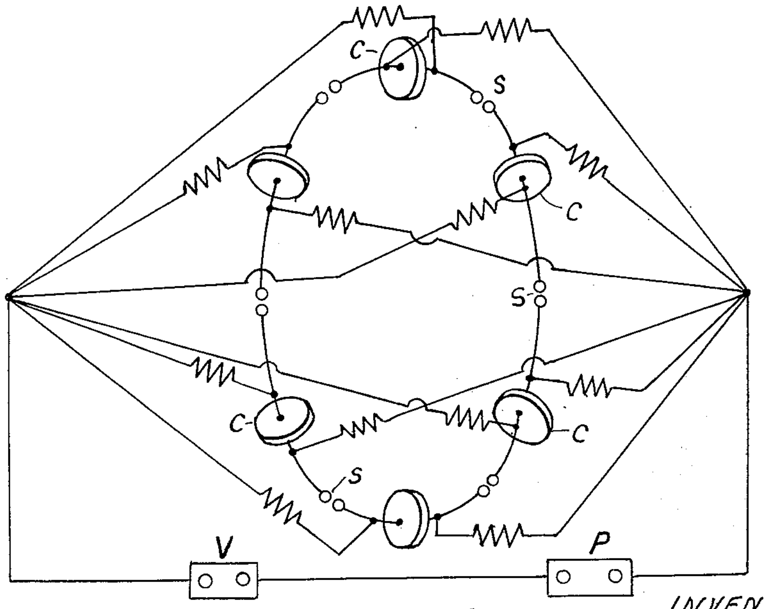
FIG. 4 is a schematic diagram of another embodiment of the charging circuit.

One suitable arrangement is schematically illustrated in FIGURE 4. Here V is a supply of a steady D.C. potential and P is a pulse generator.

The voltage supply for the transmitting array of electrical capacitors according to this invention need not be electrically grounded. If it is necessary or desirable to ground one point of the supply it is advantageous to ground the electrical centre of the supply as indicated schematically in FIG. 1. In this way the insulation requirements with respect to ground are reduced by one half.

I claim:

1. Means for the generation and transmission of very large pulses of radio frequency waves, said means consisting of a tank circuit incorporating a number of sets of electrical reactor units arranged symmetrically and forming a closed circular and annular array, each said set consisting of a condenser and inductance means, said reactor units having their free terminals connected to spark gap terminals located in juxtaposition to spark gap terminals of adjoining sets of said electrical reactor units the number of said sets and said spark gaps being the maximum number physically suitable in said array for a predetermined L—C value, a plurality of charging resistors for said condensers, one said resistor being associated with and connected to each condenser terminal, said resistors being connected to a source of potential and being arranged in radio symmetry, said tank circuit being extended spatially to constitute a magnetic dipole aerial the diameter of the said circuit being determined by wave length and radiation resistance of the signal transmitted.

2. Means for the generation and transmission of very large pulses of radio frequency waves, said means consisting of a tank circuit incorporating a number of sets of electrical reactor units arranged symmetrically and forming a closed circular and annular array, each said set consisting of a condenser connected to two inductances, said reactor units having their free terminals connected to spark gap terminals located in juxtaposition to spark gap terminals of adjoining sets of said electrical reactor units the number of said sets and said spark gaps being the maximum number physically suitably in said array for a predetermined L—C value, a plurality of charging resistors for said condensers, one said resistor being associated with and connected to each condenser terminal, said resistors being connected to a source of potential and being arranged in radial symmetry, said tank circuit being extended spatially to constitute a magnetic dipole aerial the diameter of the said circuit being determined by the wave length and the radiation resistance of the signal transmitted.

3. Means for the generation and transmission of very large pulses of radio frequency waves, said means consisting of a tank circuit constructed as a single radio frequency circuit and incorporating a number of sets of electrical reactor units arranged symmetrically and forming a closed circular and annular array, each said unit consisting of a condenser and inductance means, said reactor units having their free terminals connected to spark gap terminals located in juxtaposition to spark gap terminals of adjoining sets of said electrical reactor units the number of said sets and said spark gaps being the maximum number physically suitable in said array for a predetermined L—C value, a plurality of charging resistors for said condensers, one said resistor being associated with and connected to each condenser terminal, said resistors being connected to a source of potential and being arranged in radial symmetry, all constructed so that any potential difference in the circuit does not exceed the charging potential of any one of the reactor units, said tank circuit being extended spatially to constitute a magnetic dipole aerial the diameter of the said circuit being determined by the wave length and the radiation resistance of the signal transmitted.

4. Means for the generation and transmission of very large pulses of radio frequency waves, said means consisting of a tank circuit constructed as a single radio frequency circuit and incorporating a number of sets of electrical reactor units arranged symmetrically and forming a closed circular and annular array, each said unit consisting of a condenser connected to two inductances, said reactor units having their free terminals connected to spark gap terminals located in juxtaposition to spark gap terminals of adjoining sets of said electrical reactor units the number of said sets and said spark gaps being the maximum number physically suitable in said array for a predetermined L—C value, a plurality of each said condenser being constructed to withstand the break-down potential of the spark gaps, charging resistors for said condensers, one said resistor being associated with and connected to each condenser terminal, said resistors being connected to a source of potential and being arranged in radial symmetry all constructed so that any potential difference in the circuit does not exceed the charging potential of any one of the reactor units, said tank circuit being extended spatially to constitute a magnetic dipole aerial the diameter of the said circuit being determined by the wave length and the radiation resistance of the transmitted signal.

5. Means for the generation and transmission of very large pulses of radio frequency waves, said means consisting of a tank circuit constructed as a single radio frequency circuit and incorporating a number of sets of electrical reactor units arranged symmetrically and forming a closed circular and annular array, each said unit consisting of a condenser and inductance means formed by the internal inductance of the condenser of each reactor unit, said reactor units having their free terminals connected to spark gap terminals located in juxtaposition to spark gap terminals of adjoining sets of said electrical reactor units the number of said sets and said spark gaps being the maximum number physically suitable in said array for a predetermined L—C value, a plurality of charging resistors for said condensers, one said resistor being associated with and connected to each condenser terminal, said resistors being connected to a source of potential and being arranged in radial symmetry, and all constructed so that any potential difference in the circuit does not exceed the charging potential of any one of the reactor units, said tank circuit being extended spatially to constitute a magnetic dipole aerial the diameter of the said circuit being determined by the wave length and radiation resistance of the signal transmitted.

6. Means for the generation and transmission of very large pulses of radio frequency waves, said means consisting of a tank circuit constructed as a single radio frequency circuit and incorporating a number of sets of electrical reactor units arranged symmetrically and forming a closed circular and annular array, each said unit consisting of a condenser connected to two inductances, said inductances having their free terminals connected to spark gap terminals located in juxtaposition to spark gap terminals of adjoining sets of said electrical reactor units the number of said sets and said spark gaps being the maximum number physically suitable in said array for a predetermined L—C value, a plurality of charging resistors for said condensers, one said resistor being associated with and connected to each condenser terminal, said resistors being connected to a source of potential and being arranged in radial symmetry, and all constructed so that any potential difference in the circuit does not exceed the charging potential of any one of the reactor units, said tank circuit being extended spatially to constitute a magnetic dipole aerial and, a number of symmetrical reflectors arranged about the electrical reactor units to control the radiation pattern and radiation resistance of the array of said reactor units the diameter of the said circuit being determined by the wave length and radiation resistance of the signal transmitted.

7. Means for the generation and transmission of very large pulses of radio frequency waves as claimed in claim 5 wherein the radiation pattern and radiation resistance of the array of electrical reactors is controlled by closed circular conductors arranged co-axial with the array of electrical reactor units.

8. Means for the generation and transmission of very large pulses of radio frequency waves as claimed in claim 5 wherein the radiation pattern and radiation resistance of the array of electrical reactors is controlled by closed circular conductors arranged co-planar with the array of electrical reactor units.

9. Means for the generation and transmission of very large pulses of radio frequency waves, said means consisting of a tank circuit constructed as a single radio frequency circuit and incorporating a number of sets of electrical reactor units arranged symmetrically and forming a closed circular and annular array, each said unit consisting of a condenser connected to two inductances, said inductances having their free terminals connected to spark gap terminals located in juxtaposition to spark gap terminals of adjoining sets of said electrical reactor units, the number of said sets and said spark gaps being the maxinum number physically suitable in said array for a predetermined L—C value, a plurality of charging resistors for said condensers, one said resistor being associated with and connected to each condenser terminal, said resistors being connected to a source of potential and being arranged in radial symmetry, means to superimpose a voltage impulse upon the charging potential to the electrical reactor units so that the spark gaps of all said reactor units will discharge simultaneously, all constructed so that any potential difference in the circuit does not exceed the charging potential of any one of the reactor units, said tank circuit being extended spatially to constitute a magnetic dipole aerial and, a parabolic reflector arranged about the electrical reactor units to control the radiation pattern and radiation resistance of the array of said reactor units the diameter of the said circuit being determined by the wave length and radiation resistance of the signal transmitted.

References Cited in the file of this patent

UNITED STATES PATENTS

| | | |
|---|---|---|
| 1,216,615 | Seibt | Feb. 20, 1917 |
| 1,820,004 | Kruesi | Aug. 18, 1931 |
| 2,166,750 | Carter | July 18, 1939 |
| 2,447,879 | Scheldorf | Aug. 24, 1948 |
| 2,716,191 | Bartuska | Aug. 23, 1955 |